United States Patent
Hofmann et al.

(10) Patent No.: US 7,290,998 B2
(45) Date of Patent: Nov. 6, 2007

(54) QUICK SET-UP SYSTEM FOR CALIBRATION DEVICES

(75) Inventors: Jörg Hofmann, Ascha (DE); Gerhard Macht, St. Englmar (DE); Peter Landes, Wiesenfelden (DE)

(73) Assignee: Thyssen Polymer GmbH, Bogen (DE)

( * ) Notice: Subject to any disclaimer, the term of this patent is extended or adjusted under 35 U.S.C. 154(b) by 385 days.

(21) Appl. No.: 10/962,965

(22) Filed: Oct. 12, 2004

(65) Prior Publication Data
US 2005/0120771 A1    Jun. 9, 2005

(30) Foreign Application Priority Data
Oct. 16, 2003 (DE) .............................. 103 48 242

(51) Int. Cl.
*B29C 47/90* (2006.01)

(52) U.S. Cl. .................. 425/186; 425/71; 425/190; 425/326.1; 425/388

(58) Field of Classification Search .............. 425/71, 425/186, 190, 326.1, 388, 392
See application file for complete search history.

(56) References Cited
U.S. PATENT DOCUMENTS 4,090,828 A * 5/1978 Renegar ................. 425/71
4,674,969 A * 6/1987 Korn ..................... 425/325
5,514,325 A * 5/1996 Purstinger .............. 264/560
5,578,328 A * 11/1996 Groeblacher ............ 425/71
6,213,752 B1 * 4/2001 Sadinski ................ 425/186
6,244,847 B1 * 6/2001 Wegmaier et al. .......... 425/71
6,287,102 B1 * 9/2001 Franz et al. .............. 425/71

* cited by examiner

*Primary Examiner*—Robert Davis
*Assistant Examiner*—Joseph Leyson
(74) *Attorney, Agent, or Firm*—Day Pitney LLP

(57) ABSTRACT

The invention relates to a quick set-up system for calibration devices located downstream from an extruder, in particular one for synthetic profiles. With this quick set-up system, a dry gauge and the vacuum tank(s) are mounted on two horizontally positioned tubes that are positively connected to the calibration stage, such that they can be moved and adjusted horizontally and vertically, which enables an exact advance adjustment of the gliding device, and with it, of the vacuum tanks and calibration device, thus eliminating a subsequent alignment. In addition, by installing a central water disposal system, the required replacement of hoses with different lengths when moving the vacuum tanks is avoided.

3 Claims, 4 Drawing Sheets

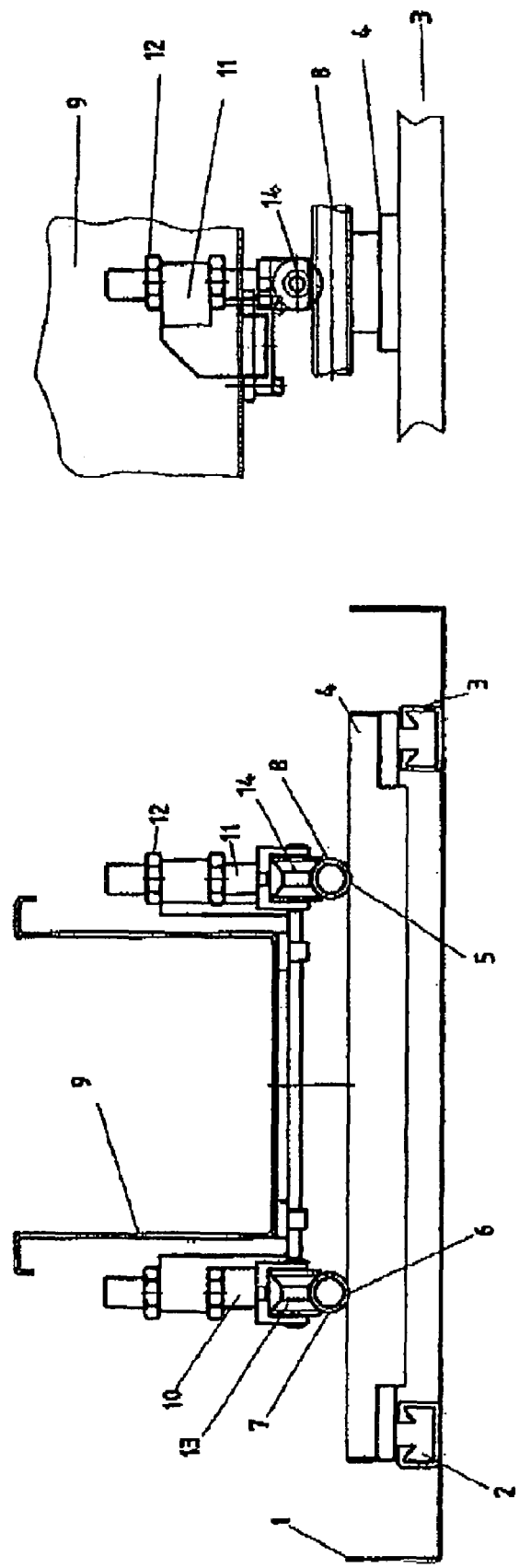

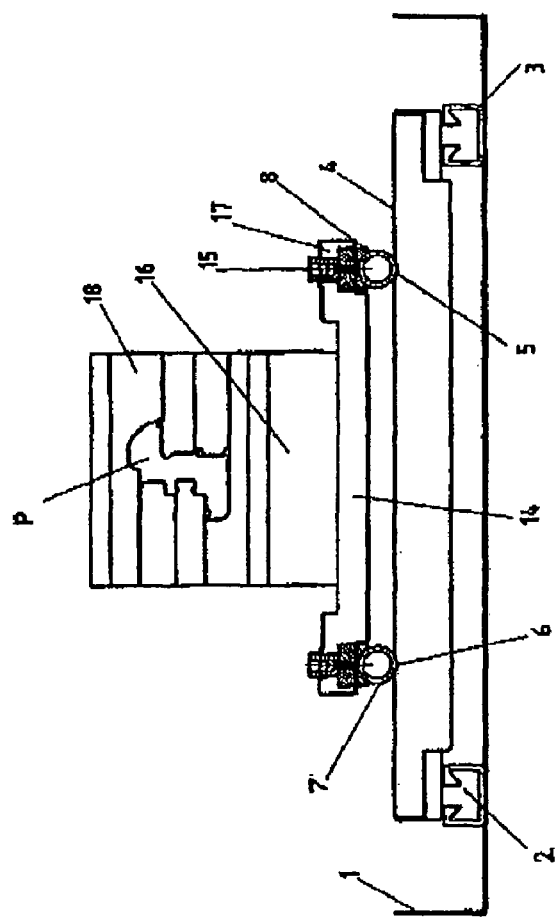
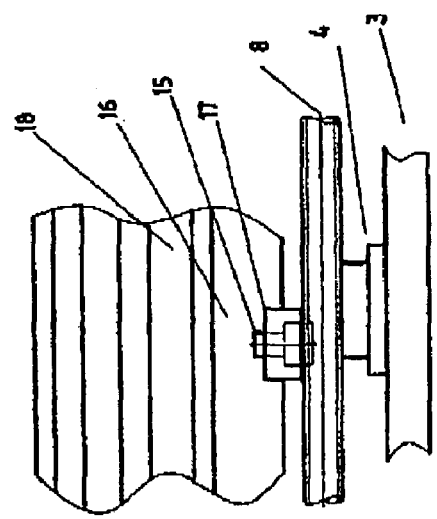
Fig 3
Fig 4

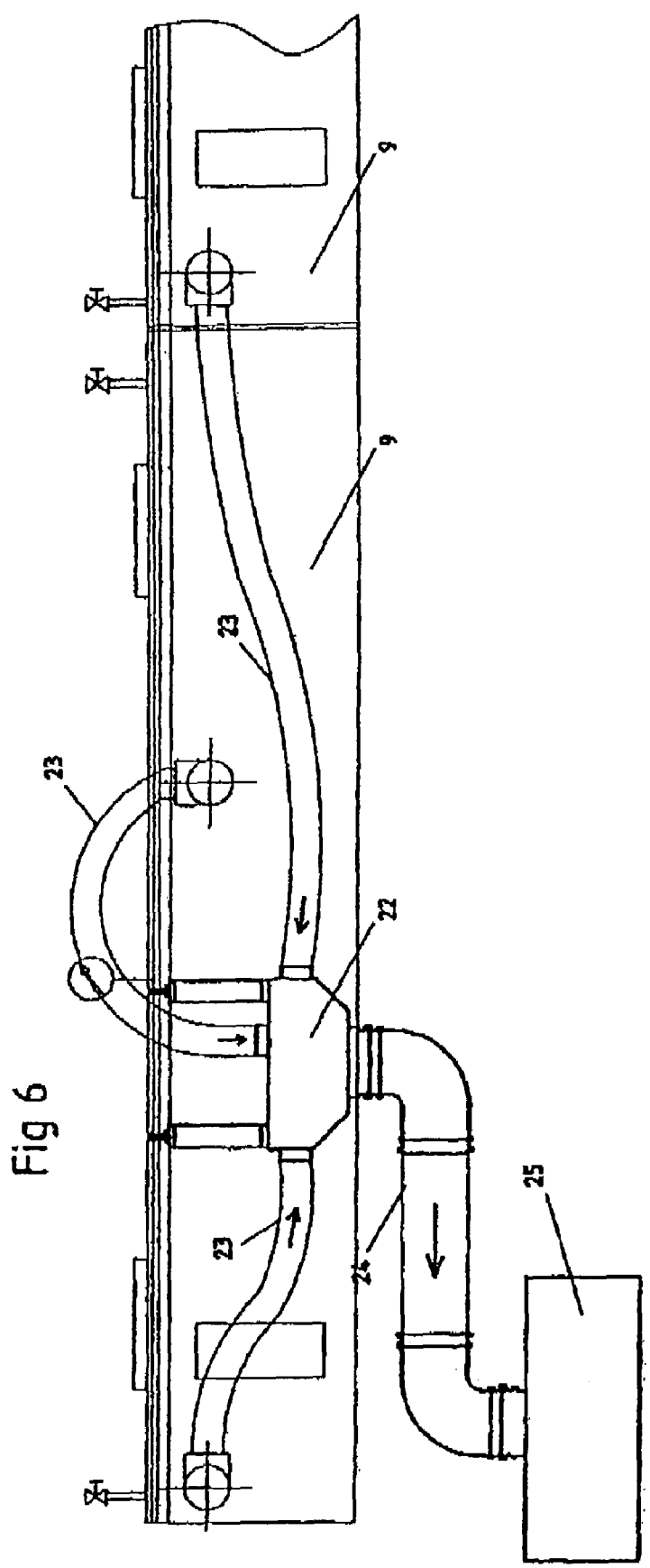

QUICK SET-UP SYSTEM FOR CALIBRATION DEVICES

BACKGROUND OF THE INVENTION

The invention relates to a quick set-up system for calibration devices with a dry gauge mounted on a calibration stage and, downstream from it, (a) vacuum tank(s) for the calibration or cooling, respectively, of the extrudate.

Set-up devices for extruder plants are essentially known. With these systems, both the dry gauge for the extruded profile and the vacuum tank used for the cooling and thus the solidification of the extrudate are positively connected to the calibration stage. As a result of this arrangement, with each change in tools, required for each new extruded profile, a different dry calibration unit with other lengths must be attached, and at the same time and caused by it, a new alignment (relocation) of the vacuum tanks and of their supply and disposal system must be carried out, and must be mounted in a new position using a crane, and just as the calibration unit itself, must be newly adjusted with every change.

SUMMARY OF THE INVENTION

It is apparent that this procedure is not only very complex but also very time-consuming.

It is, therefore, the objective of the invention, as described in the claims, to improve such a set-up system such that set-up times when changing the extrusion tools and calibration devices are significantly shortened and that the corresponding cooling water supply and disposal is matched to the circumstances.

In particular, the invention offers the advantage that no crane is required for set-up and that the set-up time in any case can be reduced by at least 50%. Furthermore, the calibration device and the vacuum tank(s) no longer need to be aligned. An additional advantage is a significant improvement in the quality of the extruded profiles.

BRIEF DESCRIPTION OF THE DRAWINGS

The invention is explained in greater detail below, based on an exemplary embodiment presented in the figures, of which:

FIG. 1 is a schematic presentation of the height adjustment of the vacuum tank, FIG. 2 shows a side view of FIG. 1 with the vertical and horizontal adjustment, FIG. 3 is a schematic presentation of the height adjustment of the calibration device, FIG. 4 shows the side view of FIG. 3, FIG. 6 is a schematic view of the water disposal.

DETAILED DESCRIPTION OF THE PREFERRED EMBODIMENT

Figure 5:
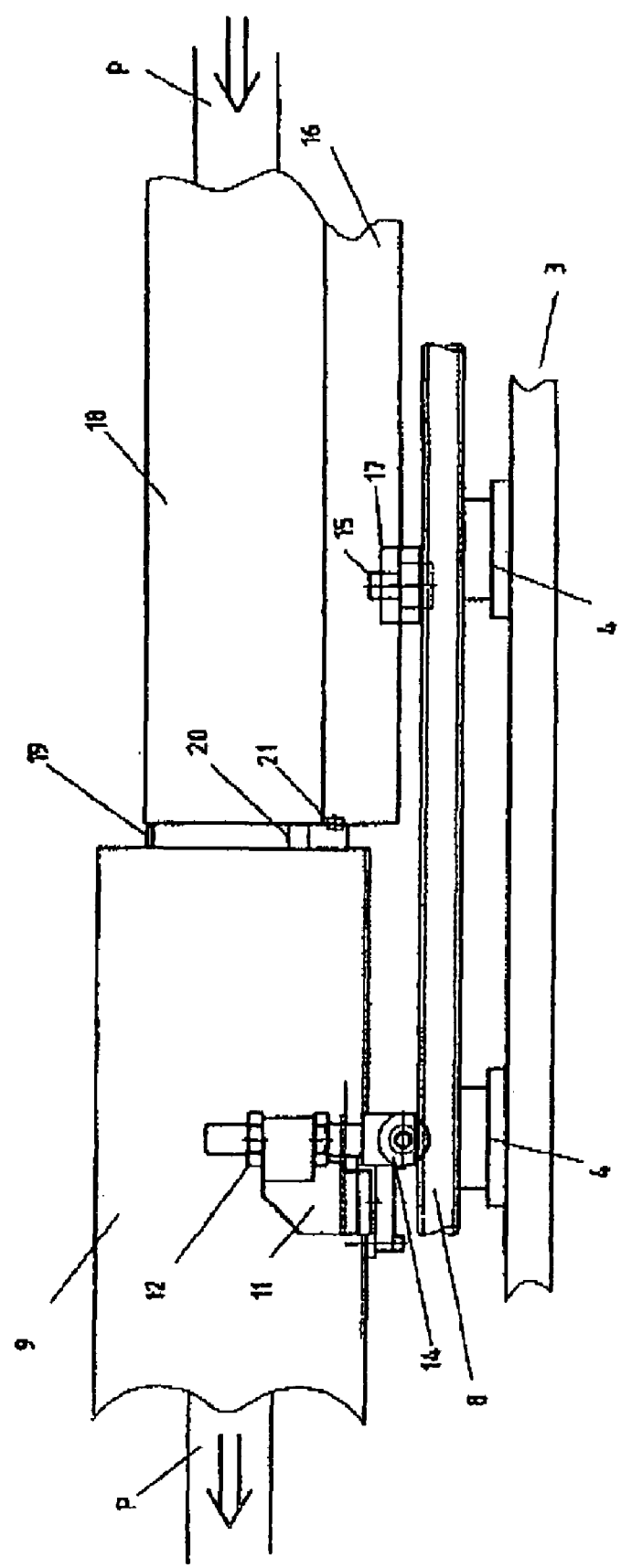
FIG. 5 shows the adjustment calibration device—vacuum tank.

As shown in FIG. 1, located on the calibration stage 1 to the right and left in the extrusion direction are one Halfen channel 2 and 3 each, on which, in the extrusion direction, one or more crossbeams 4 are supported. At the side facing away from the calibration stage 1, the crossbeams 4 exhibit two grooves 5 and 6 that serve as running guides for the profiles 7 and 8, tubes for example. The vacuum tank 9 is connected on both sides in the extrusion direction using a carrier arm 10,11, which is adjustable in the vertical direction, whereby the carrier arm is equipped with an adjustment mechanism 12, for example a thread, an electromagnetic actuator or the like for the adjustment. The two carrier arms 10 and 11 are connected with gliding devices 13,14, for example rollers or the like and can be moved horizontally on the profiles 7 and 8. In this manner, the vacuum tank 9 can be moved and adjusted effortlessly in the horizontal direction.

FIG. 2 shows a side view of FIG. 1

The height adjustment for the calibration device 18 becomes apparent from FIGS. 3 and 4, whereby the FIG. 1 is presented in the extrusion direction and is located before the vacuum tank 9, and is connected positively yet adjustably to said vacuum tank, as becomes apparent from FIG. 5. Both devices, the calibration device 18 and the vacuum tank 9 can be moved on the parallel running profiles 7 and 8, both individually or together, using the gliding device 13,14. The calibration device 18 is carried by a system plate 16 and can be adjusted vertically using an adjustment mechanism 15 that is provided at the base 17 of said plate, independent of the vacuum tank 9. The profile to be calibrated, for example a frame extrusion, is designated with the letter P.

FIG. 5 shows schematically the reciprocal vertical adjustment vacuum tank 9—calibration device 18. This is accomplished using an adapter plate 19 that is inserted between the calibration device 18 and the vacuum tank 9 as well as a fine-adjustable centering device 21: vacuum tank 9—adapter plate 19, and in addition such a centering device 20: adapter plate 19—calibration device 18. The calibration device 18 is positively attached to the profiles 7,8 via the crossbeams 4. Through the possibility of adjusting the gliding devices 13,14 via the adjustment mechanism 12, it is possible to adjust the entire extrusion line exactly in advance in order to avoid a subsequent adjustment of the vacuum tank(s) 9. If a different profile P is extruded and calibrated, then only the vacuum tank(s) 9 are moved on the profiles 7,8 and connected with the calibration device 18 via the adapter plate 19 for the required calibration device 18 with different dimensions. Due to the adjustment possibility on the profiles 7,8, the calibration device 18 itself is always oriented correctly in relation to the vacuum tank.

From FIG. 6 it becomes apparent that a central water disposal station 22 is provided at the first vacuum tank 9. In this manner, all other water disposal lines 23 of additional—but not shown—vacuum tanks can be connected with this central water disposal station 22, which may be connected to a central collection container 25 via a flexible hose 24, for example. In this manner, a change of the disposal hoses of the vacuum tanks 9 is no longer required when said vacuum tanks are moved. An additional result is that the overall hose lengths of the extrusion line become shorter, leading to a calmer extraction of the cooling water/air mixture from the vacuum tank(s) 9.

The process for an extruded synthetic profile P, for example a window frame or casement profile, is as follows: The profile P, which is still in a thermo-elastic state and still to be calibrated, enters on the right side of the drawing into the calibration device 18, runs through it, then through the vacuum tank(s) 9 and then exits at the left of the drawing as a solidified profile. Extruder, outlet, etc. are not shown in the figures. If a different profile P is to be calibrated in a different calibration device 18, an unproblematic horizontal movement of the vacuum tank(s) 9, placing of the new calibration device and adjustment of the individual components is sufficient. Complicated handling using a crane for the modification of the extrusion line is avoided, the set-up time is reduced to 50% or less, and the quality of the extruded profile P is improved.

The invention claimed is:

1. A Quick set-up system mounted on a calibration stage for calibration devices comprising, a dry gauge for the calibration of an extrudate and, downstream from the said dry gauge for calibration, one or more tanks, for the cooling of the extrudate, wherein on the calibration stage, at least one cross beam is supported onto which two profiles, running horizontal and parallel, are attached and in that both the dry gauge and the one or more vacuum tanks are mounted on these profiles with gliding devices, wherein the one or more vacuum tanks are equipped with carrier arms having at their ends the gliding devices which are vertically adjustable on both profiles and, wherein the dry gauge is carried by a vertically adjustable system plate mounted on both profiles.

2. A quick set-up system according to claim 1, wherein a central water disposal station is provided at the one or more vacuum tanks.

3. A quick set-up system as set forth in claim 2, wherein the central water disposal station is connected to a collection container by a flexible hose.

* * * * *